United States Patent [19]

Torstenfelt

[11] 4,050,560
[45] Sept. 27, 1977

[54] FLUID PRESSURE ACTUATED CLUTCH FOR STARTING MULTI-STAGE TURBINE

[75] Inventor: N. A. Ragnar Torstenfelt, Finspong, Sweden

[73] Assignee: Stal-Laval Turbin AB, Finspong, Sweden

[21] Appl. No.: 658,653

[22] Filed: Feb. 17, 1976

[30] Foreign Application Priority Data

Feb. 19, 1975 Sweden .............................. 7501831

[51] Int. Cl.² .............................................. F16D 25/00
[52] U.S. Cl. .................................. 192/85 AT; 192/47; 192/103 F
[58] Field of Search ................. 192/85 AT, 104 F, 47, 192/46, 103 F, 104 B, 104 C, 106 F

[56] References Cited

U.S. PATENT DOCUMENTS

| 857,637 | 6/1907 | Leiger | 192/85 AT |
|---|---|---|---|
| 928,679 | 7/1909 | Mather | 192/85 AT |
| 2,863,545 | 12/1958 | Sparse | 192/104 C |
| 3,187,512 | 6/1965 | Gabriel | 192/47 X |
| 3,324,984 | 6/1967 | Brame | 192/104 C |
| 3,407,912 | 10/1968 | Moore | 192/103 FA |
| 3,521,505 | 7/1970 | Sebring | 192/104 B |
| 3,844,391 | 10/1974 | Hallerberg | 192/104 B |

FOREIGN PATENT DOCUMENTS

| 256,394 | 2/1947 | Switzerland | 192/104 B |
|---|---|---|---|
| 759,753 | 10/1956 | United Kingdom | 192/104 B |
| 18,293 of | 1904 | United Kingdom | 192/85 AT |

Primary Examiner—Benjamin W. Wyche
Attorney, Agent, or Firm—Pollock, Vande Sande & Priddy

[57] ABSTRACT

A fluid pressure actuated clutch for connecting concentric, rotatable shafts in a multi-stage turbine includes a plurality of pivoted pawls mounted on one shaft for engagement with a plurality of gear teeth mounted on the other shaft upon rotation of the pawls by selectively actuatable hydraulic pistons. The pawls are spring biased and/or counterweighted to pivot out of engagement with the gear teeth when the other shaft achieves a rotational speed higher than the one shaft. The device is particularly suited for connecting concentric shafts of high and low pressure stages of turbine plants.

4 Claims, 4 Drawing Figures

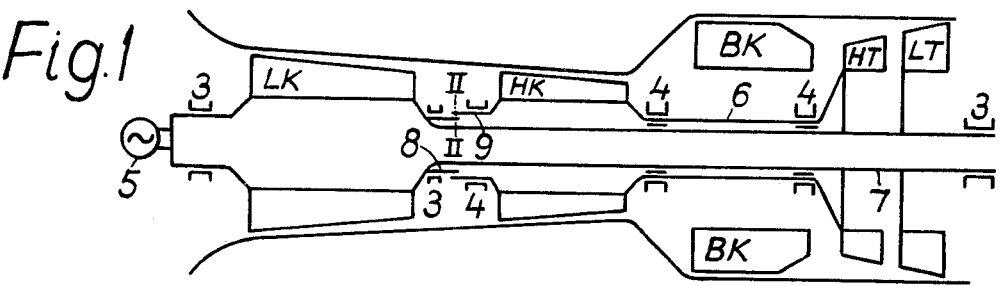
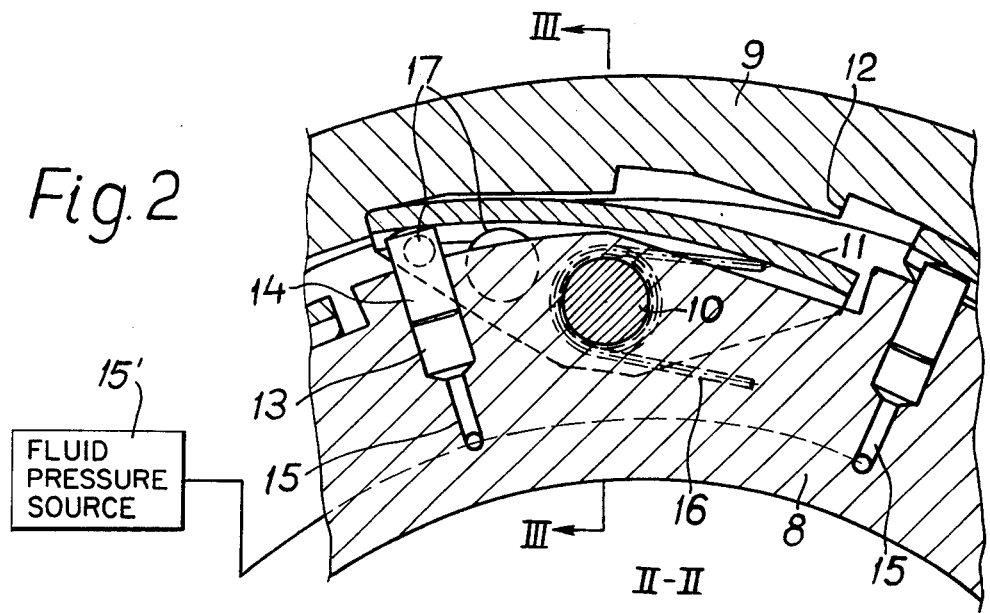
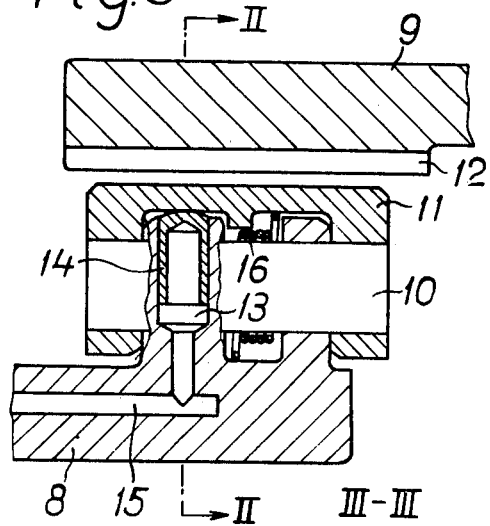
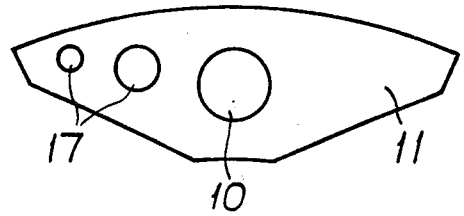

FLUID PRESSURE ACTUATED CLUTCH FOR STARTING MULTI-STAGE TURBINE

BACKGROUND OF THE INVENTION

In multi-stage turbine applications, it is known to mount the high and low pressure compressor and turbine stages on co-axial, concentric shafts which may be rotated together or independently during operation of the turbine. Due to the concentric, co-axial arrangement of the shafts, it is frequently rather difficult to gain access to both shafts for the purpose of starting or barring the turbine by rotating fthe shafts with an independent starting or barring motor. The prior art discloses various means by which the high and low pressure stages of such a turbine motor may be started or barred simultaneously by a single auxiliary motor. To achieve this result, various types of clutching devices are known for interconnecting the shafts which mount the high and low pressure stages of the turbine. A difficulty in constructing such clutching devices is to obtain a simple and safe connection during the starting or barring process and yet ensure a safe disconnection during turbine operation, to avoid unintentional engagement of the clutch with attendant inevitable damage to the turbine and clutch.

OBJECTS OF THE INVENTION

An object of the invention is to provide a clutch for connecting two co-axial, concentric shafts.

Another object of the invention is to provide such a clutch in which positive engagement is ensured by a fluid pressure actuator.

A still further object of the invention is to provide such a clutch in which complete disengagement of the clutch is ensured when the speed of one shaft exceeds the speed of the other.

These objects of the invention are given only by way of example; thus, other improvements and advantages inherently achieved by the disclosed invention may be perceived by those skilled in the art. Nonetheless, the scope of the invention is to be limited only by the appended claims.

SUMMARY OF THE INVENTION

The above objects and other advantages of the invention are achieved by the disclosed clutch apparatus which is capable of selectively connecting first and second concentric shafting and includes a plurality of pawls pivotally mounted on a first shaft, a plurality of gear teeth mounted on a second shaft in position to be engaged by the pawls, a fluid pressure actuated means for forcing the pawls into engagement with the gear teeth, and means for pivoting the pawls out of engagement with the gear teeth when the fluid pressure means has been de-activated and the second shaft is rotating faster than the first shaft. To ensure that the pawls are disengaged from the gear teeth, the pawls are provided with biasing springs and, in one embodiment, the pawls are asymmetrically formed about their pivot pin to cause them to rotate out of engagement with the gear teeth due to centrifugal force. A plurality of hydraulic cylinders and pistons are used to force the pawls into contact with the gear teeth.

BRIEF DESCRIPTION OF THE DRAWINGS

FIG. 1 shows a schematic diagram of a multi-stage turbine where the stages are interconnected by a clutch apparatus according to the invention.

FIG. 2 shows a fragmentary, sectional view taken along line II—II of FIG. 1 indicating the geometry of the clutch apparatus according to the invention.

FIG. 3 shows a sectional view taken along line III—III of FIG. 2 indicating the details of the fluid pressure clutch actuator according to the invention.

FIG. 4 shows an elevational view of a clutch pawl according to the invention, indicating means whereby the pawl is asymmetrically configured about its pivot point.

DETAILED DESCRIPTION OF THE PREFERRED EMBODIMENTS

There follows a detailed description of a preferred embodiment of the invention, reference being had to the drawing in which like reference numerals identify like elements of structure in each of the several Figures.

FIG. 1 shows a gas turbine motor having combustion chambers BK adjacent to high pressure turbine HT and low pressure turbine LT mounted on shafts 6 and 7, respectively. Shafts 6 and 7 are co-axial and journaled in bearings 4 and 3 respectively. At the opposite ends of the shafts, there are a high pressure compressor HK and a low pressure compressor LK. At the end of shaft 7, a starting, or barring, motor 5 is provided.

This type of gas turbine motor is known in the prior art and provides a feasible and soundly constructed unit; however, as mentioned previously, it is difficult to gain access to shaft 6 of the high pressure stage for starting the device. In accordance with the present invention, a clutch is arranged between shafts 7 and 6 of the low and high pressure stages. For example, the clutch is positioned between the two compressor parts LK and HK, between bearings 3 and 4. In principle, such a clutch could be arranged anywhere between the two shafts 6 and 7.

Referring to FIGS. 1 to 3, shaft 7 includes an actually extending sleeve 8 on which are mounted a plurality of pivot pins 10 for rotatably supporting clutch pawls 11 for one way engagement with a plurality of asymmetrical, internally toothed gears 12 located on axial sleeve 9 of shaft 6. Sleeve 8 includes a plurality of hydraulic or other fluid pressure cylinders 13 within which are mounted a plurality of pistons 14. When cylinders 13 are pressurized, the pistons 14 extend therefrom into contact with pawls 11 and rotate pawls 11 outwardly into engagement with gears 12 in sleeve 9. The hydraulic cylinders 13 are pressurized selectively through bores 15 in sleeve 8 from a hydraulic pressure source 15, illustrated schematically in FIG. 2.

Those skilled in the art will recognize that it is necessary to apply pressure to hydraulic cylinders 13 only when first starting or barring the turbine. This is because once the turbine begins to rotate, pawls 11 are held in their outward position by friction due to the force transmitted from sleeve 8 to sleeve 9. This force dissipates when the high pressure turbine starts and the speed of shaft 6 and sleeve 9 exceeds that of shaft 7 and sleeve 8, so that pawls 11 are pushed aside by gears 12. To ensure that pawls 11 retract fully from contact with gears 12, a plurality of biasing springs 15 are mounted about pivot pins 10 to rotate pawls 11 entirely out of engagement. As pawls 11 are rotated out of engagement, pistons 14 are also forced down into cylinders 13.

Complete disengagement of pawls 11 from gears 12 can be further ensured by forming pawls 11 asymmetrically or counterweighting them with respect to pivot pins 10, so that the right hand ends of the pawls are thrown outward by centrifugal force, as viewed in FIG. 2. In this way, an unintentional engagement is prevented in case the high pressure stage for some reason should be slowed down in relation to the low pressure stage. For example, the asymmetry or counterweighting of pawls 11 may be achieved as shown in FIG. 4 by providing through holes 17 to the left of the bore which receives pivot pin 10. Thus, the left hand portion of pawl 11, which engages gears 12, is lightened somewhat relative to the right hand portion. Because the left hand portion is lighter, it is pressed inward when the right hand portion moves outward due to centrifugal force as shaft 7 rotates.

Having described my invention in sufficient detail to enable those skilled in the art to make and use it, I claim:

1. A clutch apparatus for selectively connecting first and second concentric shafts in a multi-stage turbine, comprising:
   a plurality of pawls pivotally mounted on said first shaft;
   a plurality of gear teeth mounted on said second shaft in position to be engaged by said pawls;
   first fluid pressure actuated means connected to said first shaft for selectively forcing said pawls into engagement with said gear teeth to connect said shafts; and
   second resilient means for pivoting said pawls out of engagement with said gear teeth when said first means is depressurized and friction between said pawls and said teeth dissipates as said second shaft rotates faster than said first shaft.

2. A clutch apparatus according to claim 1, wherein said second means for pivoting comprises a plurality of springs for biasing said pawls in a direction away from engagement with said gear teeth.

3. A clutch apparatus according to claim 1, wherein said pawls are mounted on pivot pins, said pawls being asymmetrically weighted relative to said pivot pins, whereby said pawls tend to be forced out of engagement with said gear teeth due to centrifugal force as said first shaft rotates.

4. A clutch apparatus according to claim 1, wherein said first means comprises a plurality of hydraulic cylinders located in said first shaft and a plurality of pistons located in said cylinders in position to engage said pawls when said cylinders are pressurized.

* * * * *